(No Model.)
J. Y. PAYTON.
HARROW.
No. 279,793. Patented June 19, 1883.
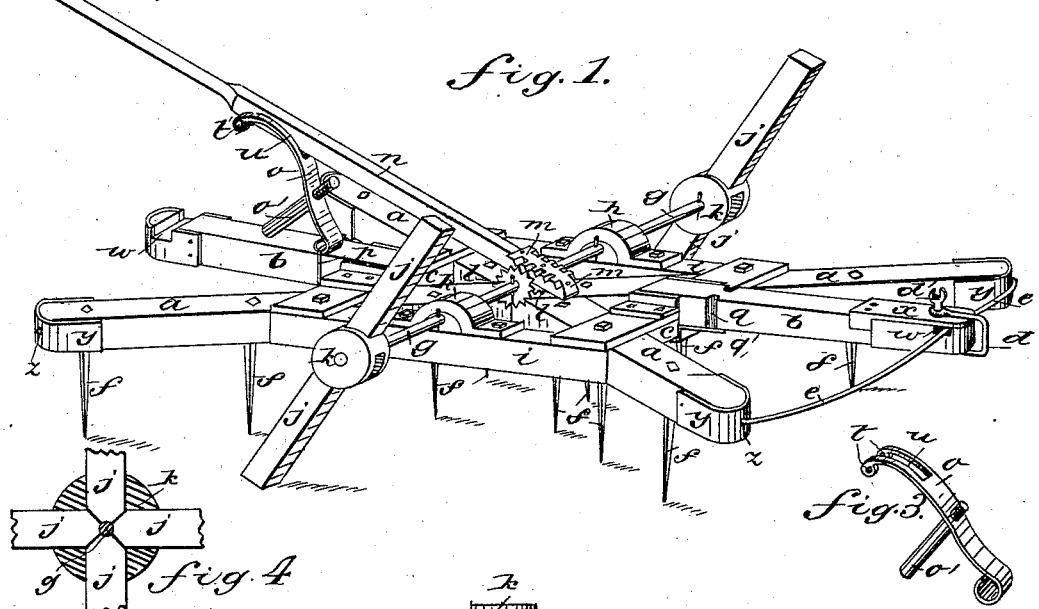
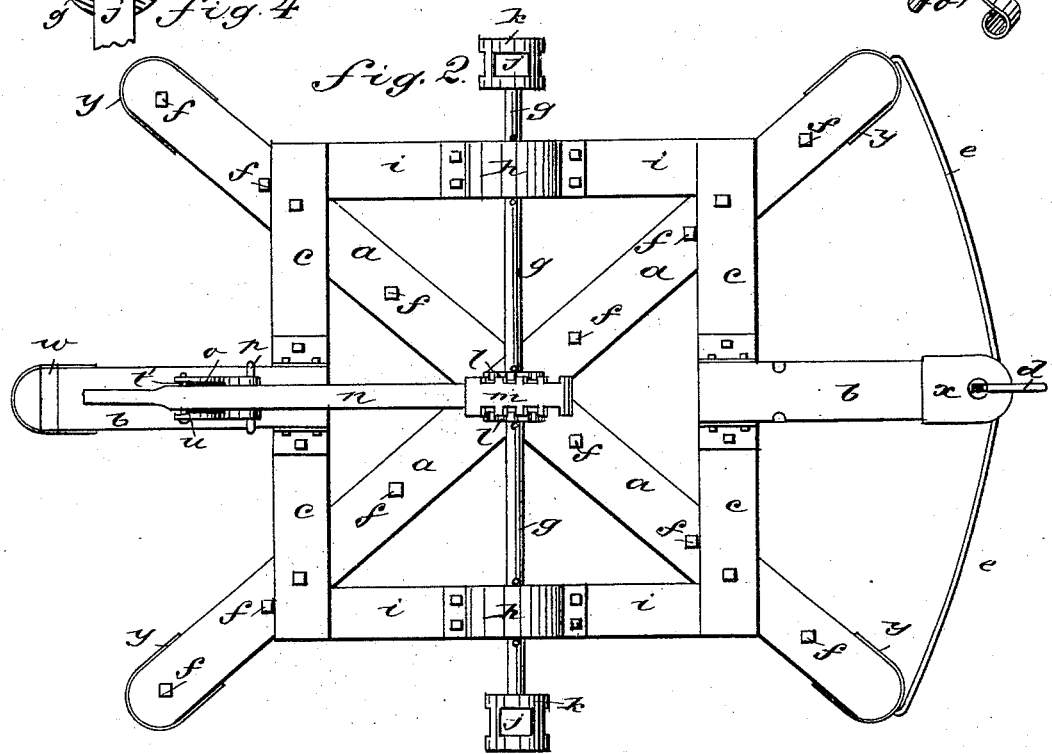
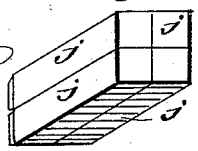
WITNESSES:
INVENTOR:
J. Y. Payton
BY Munn & Co
ATTORNEYS.

UNITED STATES PATENT OFFICE.

JAMES Y. PAYTON, OF IPAVA, ARKANSAS.

HARROW.

SPECIFICATION forming part of Letters Patent No. 279,793, dated June 19, 1883.

Application filed October 6, 1882. (No model.)

*To all whom it may concern:*

Be it known that I, JAMES Y. PAYTON, of Ipava, in the county of Sebastian and State of Arkansas, have invented a new and Improved Harrow, of which the following is a full, clear, and exact description.

The invention consists in the peculiar construction and arrangement of parts hereinafter described and claimed.

Reference is to be had to the accompanying drawings, forming part of this specification, in which similar letters of reference indicate corresponding parts in all the figures.

Figure 1 is a perspective view of my improved harrow. Fig. 2 is a plan view; and Figs. 3, 4, 5, and 6 are details.

The X-beams $a$ constitute the toothed part of the harrow, to which a tongue, $b$, is attached front and rear by a cross-beam, $c$, in such manner that the harrow may be drawn either way, with an open angle to the front, in order that the wear of the teeth may be alike, to avoid turning them, and so that the open angle of the harrow will gather in the clods at the front to the center and the rear side will spread them out again, making a kind of double action, having greater effect to pulverize them than the common form of harrow. The hitching-clevis $d$ will be transferable from one tongue to the other, and I propose to have fender-rods $e$ for the front to exclude large objects from the angles between the bars $a$, which fenders are also to be transferable from end to end of the harrow.

I propose to arrange the teeth $f$ so that those behind will follow in the middle between the tracks of those at the front.

To raise the harrow and cause it to jump over firmly-embedded roots and other objects and free itself of trash, I arrange a shaft, $g$, crosswise of the harrow in boxes $h$, supported by side beams, $i$, with arms $j$, projecting from a wheel-hub, $k$, at each end of the shaft, said arms being of much greater length than the teeth of the harrow, so that when shifted so as to strike the ground the harrow will be thrust upward, so that the teeth will pass over without being obstructed; and in order to shift the shaft so as to set the arms against the ground, I provide the shaft with a ratchet, $l$, with which I arrange a pawl, $m$, on a bar, $n$, resting on a vibratory support, $o$, so that the driver may set the arms to work at will by shoving bar $n$ ahead until arms $j$ strike the ground. The bar then falls back on its support, while the harrow jumps one or more times, according to the number of arms in the hubs. The arms $j$ are detachably connected with the hub in order that one to four may be used in each hub, according to the number of jumps that the harrow is to be required to make at one time, one arm making one jump, two arms two jumps, three arms three jumps, and four arms will cause it to jump continuously for moving the harrow over ground where the teeth are not required to act. The arms not attached to the hubs should be tied in a bundle, as in Fig. 5, and be carried on the harrow to be ready for use when needed. Two will probably be used the most, as represented in Fig. 1. Fig. 4 shows the application of all the arms, and illustrates the way they should be fitted in the hubs, the ends entering sockets and bearing against the shaft.

The bar $n$ and the support $o$ are changeable at will from end to end of the harrow, the support being pivoted to a clevis, $p$, for which grooved seats $q$ are provided in each tongue, in which the ends of the clevis rest and bear on the brace-plate $q'$ suitably for its purposes, but allowing it to be readily detached. The upper end of this support is notched at $u$ to receive the bar $n$, and has a bolt, $t'$, passing through the eyes $t$ in its end, which bolt rests in a notch in the bar $n$ and serves to connect the bar to its support, so that when the bar $n$ is pushed forward the bar $o$ will turn on the clevis $p$, to which it is pivoted, and the pawl $m$ on the forward end of the bar $n$ will be carried into engagement with the ratchet $l$ and the shaft $g$ rotated. The support has an adjusting-screw, $o'$, resting on the tongue $b$, and screwing up and down in said support to set the bar $n$ as required for height.

For connecting the fender $e$ so as to be transferred readily, I make a notch, $w$, in the upper surface of the front ends of the tongues, and holes $z$ in the ends of each bar $a$, and fit the ends of the fender to enter said holes and lie centrally in said notches, where it is secured by the cap $x$, which is fastened on the tongue by the pin of the clevis $d$. The ends of the tongues and the bars $a$ are tipped with thin metal clips $y$ for protection.

The clevis-pin $d'$ will have a wrench-head for tightening the nuts.

Having thus described my invention, what I claim as new, and desire to secure by Letters Patent, is—

1. The combination, with the X-shaped beams $a$ and the tongue $b$, of the fender $e$, detachably secured to the said beams and tongue, substantially as herein shown and described.

2. The combination, with the X-shaped beams $a$, provided with holes $z$ in their ends, and the tongue $b$, provided with the notch $w$, of the fender $e$ and cap $x$, substantially as herein shown and described.

3. The combination, with the X-shaped beams $a$, provided with the holes $z$ in their ends, and the beam $b$, provided with the notch $w$, of the fender $e$, the cap $x$, and the clevis-pin $d'$, substantially as herein shown and described.

4. The combination, with the X-shaped toothed beams $a$, of the horizontal shaft $g$, provided with the jumping-arms $j$ on its ends and the ratchet $l$ at its center, of the bar $n$, provided with the pawl $m$ and means for supporting its outer end, substantially as herein shown and described.

5. The combination of bar $n$, vibrating support $o$, pawl $m$, and ratchet $l$ with the shaft $g$, jumping-arms $j$, and a harrow, substantially as described.

JAMES Y. PAYTON.

Witnesses:
M. S. WILCOX,
WM. YOWELL.